(12) United States Patent
Yoshitsune et al.

(10) Patent No.: US 8,003,030 B2
(45) Date of Patent: Aug. 23, 2011

(54) PROCESS FOR PRODUCTION OF GASKETS

(75) Inventors: Syuji Yoshitsune, Nihonmatsu (JP); Masaru Ito, Nihonmatsu (JP); Hirotaka Muragishi, Nihonmatsu (JP); Tomoyuki Koyama, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 146 days.

(21) Appl. No.: 12/517,547

(22) PCT Filed: Dec. 5, 2007

(86) PCT No.: PCT/JP2007/073498
§ 371 (c)(1),
(2), (4) Date: Jun. 3, 2009

(87) PCT Pub. No.: WO2008/069238
PCT Pub. Date: Jun. 12, 2008

(65) Prior Publication Data
US 2010/0024195 A1 Feb. 4, 2010

(30) Foreign Application Priority Data
Dec. 5, 2006 (JP) ................... 2006-328754

(51) Int. Cl.
B29C 67/00 (2006.01)
B32B 37/00 (2006.01)
(52) U.S. Cl. .................. 264/135; 264/275; 264/265
(58) Field of Classification Search .................. None
See application file for complete search history.

(56) References Cited

U.S. PATENT DOCUMENTS

| 2,037,749 A | * | 4/1936 | Anderson | 525/352 |
| 2,399,019 A | * | 4/1946 | Grinter | 428/469 |
| 3,523,875 A | * | 8/1970 | Minklei | 205/184 |
| 4,956,226 A | * | 9/1990 | Ashizawa et al. | 428/323 |
| 5,256,355 A | * | 10/1993 | Ramotowski | 264/135 |

FOREIGN PATENT DOCUMENTS

| JP | 231960 | 2/1990 |
| JP | 484862 | 7/1992 |
| JP | 11207859 | 8/1999 |
| JP | 2002243042 | 8/2002 |

* cited by examiner

Primary Examiner — Edmund H. Lee
(74) Attorney, Agent, or Firm — Niky Economy Syrengelas, Esq.; K. David Crockett, Esq.; Crockett & Crockett, PC (57) ABSTRACT

The process for producing gaskets includes the steps of: forming a metal core material (2) using a stainless steel plate; treating the resulting metal core material (2) with an alkali treating solution; preparing an unvulcanized rubber molded product (1); mounting the metal core material (2) treated in the treating step to the unvulcanized rubber molded product (1); and vulcanizing the rubber-molded product to thereby anchor the elastic material to the metal core material (2) without using an adhesive; characterized in that the alkali treating solution used in the step of alkali treatment includes the following components (A), (B), and (C):
(A) an alkali metal hydroxide or an alkaline earth metal hydroxide;
(B) an alkali metal silicate or an alkaline earth metal silicate; and
(C) a carboxylate salt.

3 Claims, 5 Drawing Sheets

(PRIOR ART)

Fig. 10

(PRIOR ART)

Fig. 11

(PRIOR ART)

PROCESS FOR PRODUCTION OF GASKETS

TECHNICAL FIELD

The present invention relates to a process for producing gaskets wherein rubber is anchored to a metal core material without using an adhesive.

BACKGROUND ART

Rubber gaskets have poor shape-retention properties when they are made of rubber alone, and are disadvantageous in that the ease of handling and the workability of mounting the rubber gaskets to desired positions are poor, thus easily causing the gaskets to fall off, or causing defective seals due to slipping.

For this reason, a layered structure of rubber and a metal core material has been heretofore produced by covering the core material with rubber so that the rubber sandwiches the core material (see, for example, Patent Documents 1 and 2).

In this case, both the rubber and the metal core must be integrated so as to prevent the core material from falling off the rubber.

The core material and rubber are typically integrated by bonding with an adhesive; this method, however, is disadvantageous in that it is costly due to the use of an adhesive.

Moreover, a siloxane adhesive is usually used as the adhesive; however, a siloxane adhesive is undesirable in that it cannot impart sufficient adhesion strength, which may result in poor contacts to devices.

Furthermore, siloxanes contained in siloxane adhesives are harmful substances, and require improvement in terms of working environment or product safety.

Figure 9:
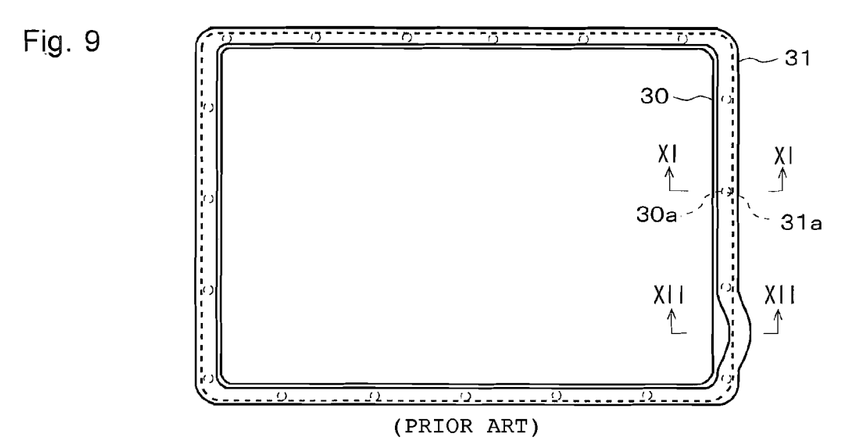
FIG. 9 is a plan view showing an example of a prior art gasket.
Figure 10:
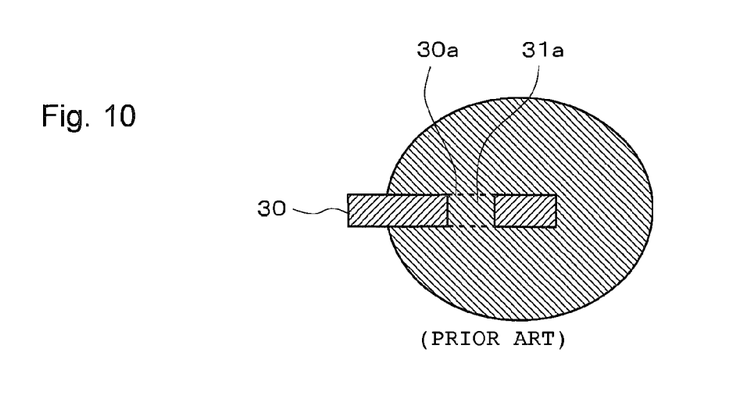
FIG. 10 is a cross-sectional view taken along the line xi-xi of FIG. 9.
Figure 11:
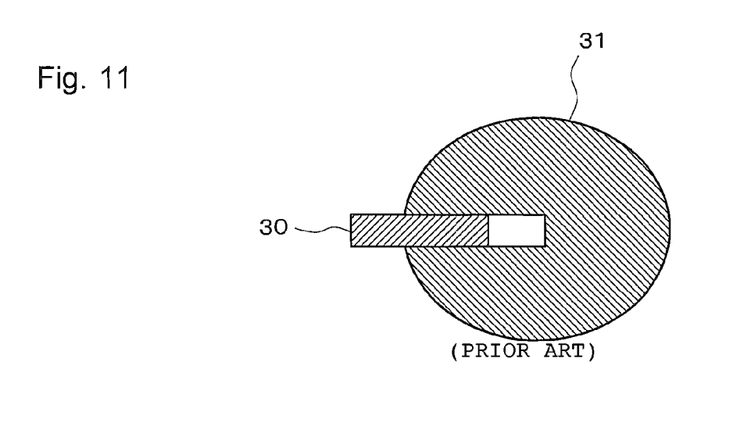
FIG. 11 is a cross-sectional view taken along the line xii-xii of FIG. 9.

For this reason, as shown in FIGS. 9, 10, and 11, Patent Document 3 discloses forming a through-hole 30a in the core material 30. The through-hole 30a serves as a connecting portion 31a to prevent the rubber 31 from easily falling off the core material 30.

However, because the rubber 31 is not bonded to the core material 30, the rubber 31 may be easily peeled from the front and back surfaces of the core material 30 at regions other than the connecting portion 31a.

That is, as shown in FIG. 11, the rubber 31 may be peeled from the core material 30, and thereby protrude out of the core material 30.

This protrusion of the rubber 31 causes the gasket to fall off the opposing seating surface to reduce the surface pressure, which may result in leakage.

Further, a technique for improving the adhesion between rubber and a metal without using an adhesive is known, as disclosed in Patent Document 4, wherein the metal surface is treated with an alkali.

Patent Document 1: Japanese Unexamined Utility Model Publication No. 2-31960
Patent Document 2: Japanese Unexamined Utility Model Publication No. 4-84862
Patent Document 3: Japanese Unexamined Patent Publication No. 2002-243042
Patent Document 4: Japanese Unexamined Patent Publication No. 11-207859

DISCLOSURE OF THE INVENTION

Problems to be Solved by the Invention

Patent Document 4 discloses sodium silicate, sodium hydroxide, and sodium carbonate as alkali treating solutions; however, these alkalis cannot impart sufficient wettability to a metal surface, resulting in poor tackiness.

Accordingly, the present invention is intended to solve the above-described prior art problems. An object of the invention is to provide a process for producing gaskets that is capable of improving the wettability of a metal surface to thereby enhance the tackiness when rubber is anchored to a metal core material without using an adhesive.

Other objects of the invention will become apparent from the following description.

Means for Solving the Problems

As a result of extensive research to solve the above-described object, the present inventors found that the degreasing effect alone, which has been heretofore obtained by an alkali treatment using sodium hydroxide or the like, is insufficient to enhance the tackiness of a metal surface. The inventors also found that an etching effect (an anchor effect) further affects the tackiness, and the etching effect (the anchor effect) is exhibited by a carboxylate salt.

The above-described object is solved by the inventions set forth below.

The invention as defined in claim 1 is a process for producing gaskets comprising the steps of forming a metal core material using a stainless steel plate; treating the resulting metal core material with an alkali treating solution; preparing an unvulcanized rubber molded product; mounting the metal core material treated in the treating step to the unvulcanized rubber molded product; and vulcanizing the rubber-molded product to thereby anchor the elastic material to the metal core material without using an adhesive; characterized in that the alkali treating solution used in the step of alkali treatment comprising the following components (A), (B), and (C):
(A) an alkali metal hydroxide or an alkaline earth metal hydroxide;
(B) an alkali metal silicate or an alkaline earth metal silicate; and
(C) a carboxylate salt.

The invention as defined in claim 2 is the process for producing gaskets according to claim 1, wherein the alkali treating solution used in the step of alkali treatment comprises a surfactant in addition to the components (A), (B), and (C).

The invention as defined in claim 3 is the process according to claim 1 or 2, wherein the alkali treatment time is from 10 to 30 minutes.

The invention as defined in claim 4 is the process according to claim 3, wherein the alkali treatment time is from 10 to 20 minutes.

EFFECTS OF THE INVENTION

In accordance with the invention, a process for producing gaskets that is capable of anchoring rubber to a metal core material without using an adhesive is provided.

EXPLANATION OF REFERENCE NUMERALS

1: rubber
10: U-shaped groove
2: core material
30: core material
30$a$: through-hole
31: rubber
31$a$: connecting portion

BEST MODE FOR CARRYING OUT THE INVENTION

Embodiments of the invention are described below.

The alkali treating solution used in the process for producing gaskets of the invention for producing gaskets includes the following components (A), (B), and (C):

(A) an alkali metal hydroxide or an alkaline earth metal hydroxide;

(B) an alkali metal silicate or an alkaline earth metal silicate; and (C) a carboxylate salt.

Figure 1:
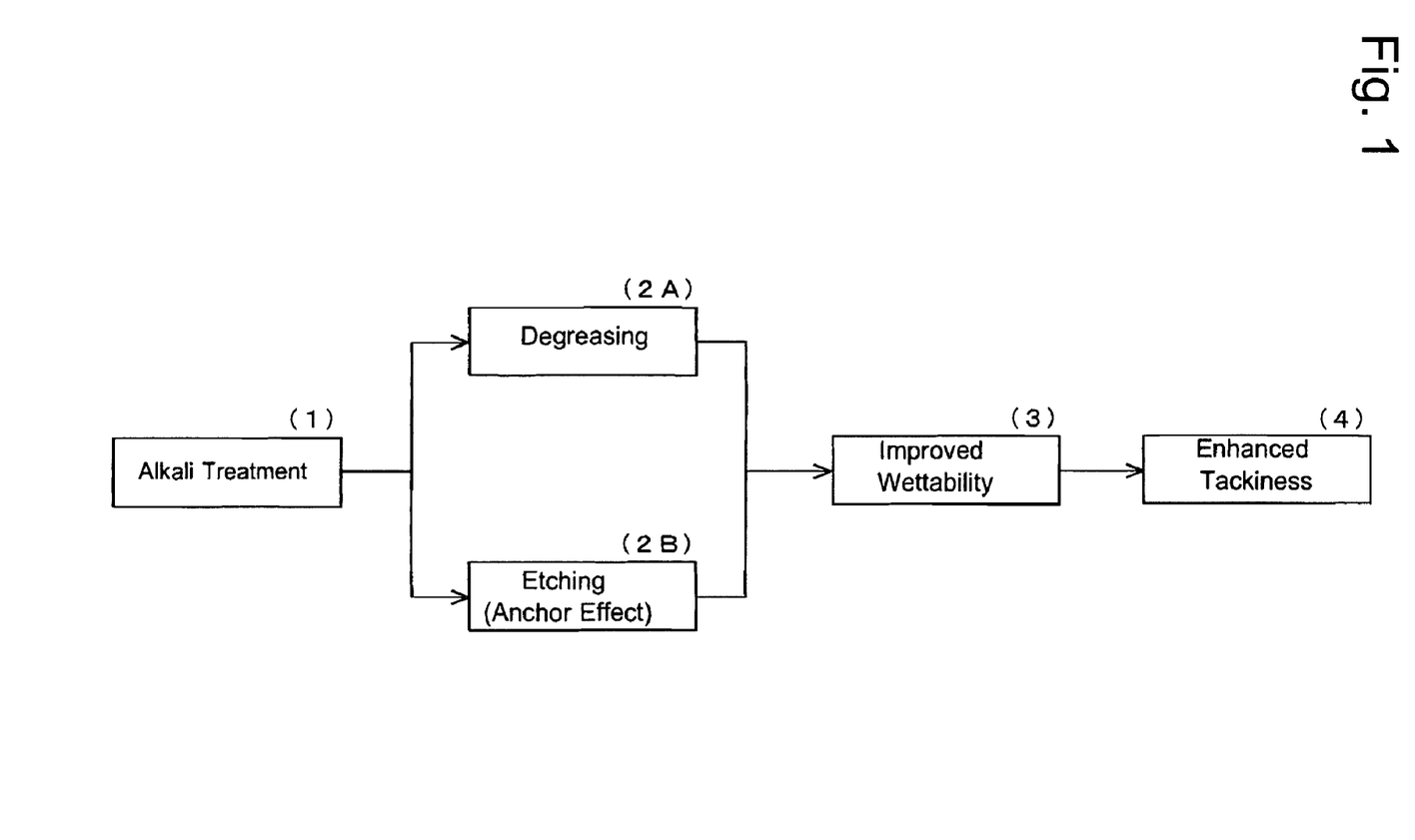
FIG. 1 is a diagram for illustrating the mechanism by which the alkali treating solution of the invention exhibits the effects of the invention.

The mechanism by which this treating solution exhibits the effects of the invention is described referring to FIG. 1.

An alkali treatment (step 1) of a stainless steel plate using the alkali treating solution including (A), (B), and (C) causes the stainless steel plate to undergo a degreasing treatment (step 2A) and an etching treatment (step 2B).

In the degreasing treatment (step 2A), (A) the alkali metal hydroxide or alkali earth metal hydroxide, e.g., sodium hydroxide, and (B) an alkali metal silicate or an alkaline earth metal silicate, e.g., $SiO_2$ groups, contained in the alkali treating solution remove any organic coating on the surface of the stainless steel plate, i.e., the surface of the stainless steel plate is degreased.

Specifically, hydrophobic groups of the components (A) and (B) attach to the oil on the stainless steel plate, thereby peeling off the oil. As a result, a plurality of OH groups are produced on the surface of the stainless steel plate to cover the entire surface in the form of single bonds with the surface metal, thereby improving the wettability (step 3).

These OH groups attain tackiness between the stainless steel plate and rubber by intermolecular forces, forming hydrogen bonds, or the like, with, e.g., silicone rubber.

The etching treatment (step 2B) is attained by the action of (C) the carboxylate salt. The COOH groups in the carboxylate salt remove any oxide coating on the surface of the stainless steel plate. This improves the hydrophilic properties of the surface of the stainless steel plate, resulting in satisfactory wettability (step 3).

Moreover, the carboxylate salt not only removes the oxide coating on the surface of the stainless steel plate, but also forms surface irregularities, i.e., exhibits an etching effect. A suitable degree of etching will exhibit an anchor effect with rubber, resulting in improved tackiness (step 4).

Figure 2:
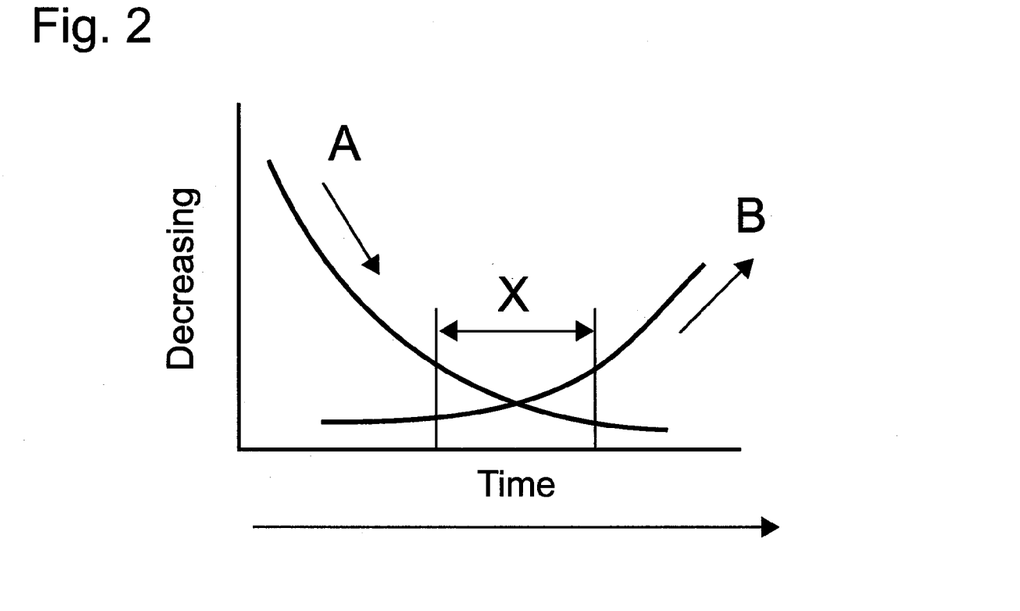
FIG. 2 illustrates the experimental results showing the relationship between the degreasing time and wettability.

As a result of research conducted by the inventors, degreasing and etching for an excessively long period of time was found to deteriorate the wettability, which deteriorates the tackiness. FIG. 2 illustrates the experimental results showing the relationship between the degreasing time and wettability, and FIG. 3 illustrates the experimental results showing the relationship between the etching time and wettability.

In FIG. 2, the curve A shows how the organic coating decreases according to the degreasing time. The curve B shows how the amount of $SiO_2$ increases according to the degreasing time. The inventors assumed that, since an increase in the amount of $SiO_2$ deteriorates the wettability, there may be an allowable range of wettability in which the effects of the invention can be attained, and consequently found that the satisfactory range X of the degreasing time shown in the figure is preferable to enhance the tackiness.

Figure 3:
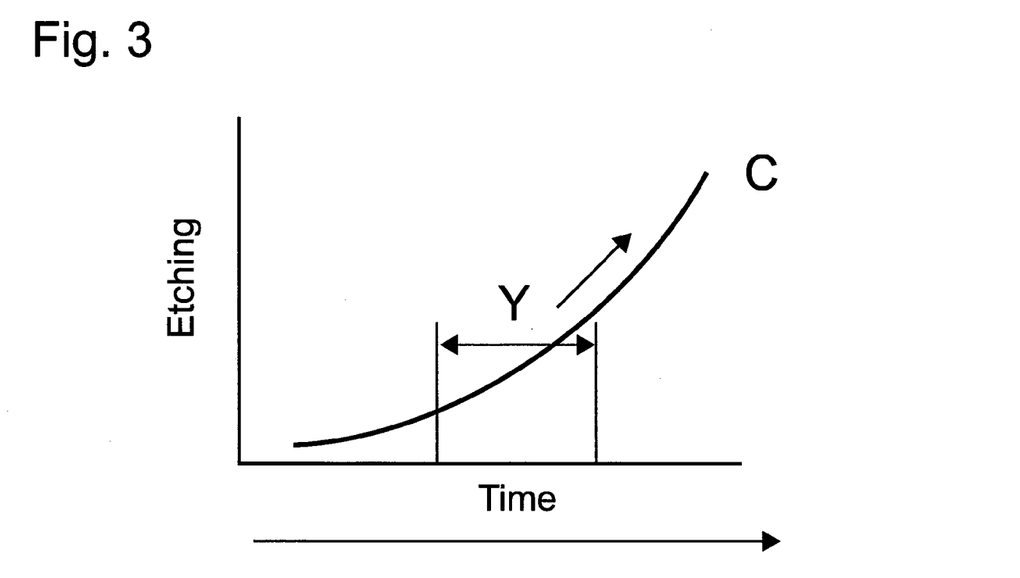
FIG. 3 illustrates the experimental results showing the relationship between the etching time and wettability.

In FIG. 3, the curve C shows how the wettability changes according to the etching time. The reason for the change in wettability was found to be that when the etching time is long, the surface irregularities of the stainless steel plate are combined, which causes the tackiness to deteriorate. The inventors found that the allowable range of wettability in which the effects of the invention can be attained corresponds to the satisfactory range Y of the etching time shown in the figure, and the range Y is preferable to enhance the tackiness.

The alkali treatment time (the satisfactory range X of degreasing time and the satisfactory range Y of etching time) is preferably from 10 to 30 minutes, and more preferably from 10 to 20 minutes.

A detailed examination of the satisfactory range X of degreasing time and the satisfactory range Y of etching time will be described later in the Examples.

The process for producing gaskets of the invention is next described in detail.

A metal core material is formed so as to conform to the shape of the position of a device to which a gasket is applied. In the invention, a stainless steel plate is shaped into a circle or a rectangular ring by press- or wire-cutting. Examples of stainless steel plates include SUS301, SUS301H, SUS304, SUS430, etc., with SUS304 being preferred. The thickness of the plate is generally from about 0.1 to about 2 mm for gasket applications.

The alkali treating solution includes (A) an alkali metal hydroxide or an alkaline earth metal hydroxide (hereinafter also referred to as the component A), (B) an alkali metal silicate or an alkaline earth metal silicate (hereinafter also referred to as the component B), and (C) a carboxylate salt (hereinafter also referred to as the component C).

Examples of the component A include alkali metal hydroxides such as sodium hydroxide and potassium hydroxide; and carbonates such as sodium carbonate, sodium hydrogencarbonate, potassium carbonate, and potassium hydrogencarbonate, with sodium hydroxide being preferred.

These components A mainly exhibit a degreasing action.

Examples of the component B include (ortho- or meta-) sodium silicate and calcium silicate, with sodium silicate being preferred. These components B mainly exhibit a degreasing action.

Preferable as carboxylate salts, i.e., the component C, are compounds containing two or more carboxyl groups (COOH groups) (e.g., EDTA (Ethylene Diamine Tetraacetic Acid)), because these compounds exhibit a satisfactory etching effect. A sodium salt, a potassium salt, and the like are preferable as carboxylate salts, with a sodium salt being preferred. These components C exhibit an etching action.

The proportions of the components A, B, and C may be determined as desired and are not particularly limited, but the proportion of the component A is preferably from 30 to 50 wt %, the proportion of the component B is preferably from 2 to 35 wt %, and the proportion of the component C is preferably from 0.1 to 1.5 wt %.

An alkali treating solution containing the components A, B, and C is commercially available.

For example, "PAKUNA SDC" manufactured by Yuken Industry Co., Ltd. can be used. This product contains the components A, B, and C. Specifically, PAKUNA SDC principally contains sodium hydroxide (the component A), a silicate (the component B), and a carboxylate salt (the component C), as well as a carbonate, various surfactants, and the like.

The proportions of the components A, B, and C in PAKUNA SDC are as follows: the component A: from 30 to 50 wt %; the component B: from 2 to 50 wt %; and the component C: from 0.1 to 1.5 wt %.

In the invention, "PAKUNA SDC" containing the components A, B, and C may be blended with "ALUNION E" or "ALUNION G", which is composed of a carboxylate salt, manufactured by Yuken Industry Co., Ltd., and used.

"ALUNION E" or "ALUNION G" contains EDTA or sodium gluconate ($C_6H_{11}NaO_7$).

Along with the components A, B, and C, the alkaline treating solution of the invention may contain NTA (Nitrilo Triacetic Acid), HEDTA (Hydroxyethyl Ethylene Diamine Triacetic Acid), and the like, as long as the effects of the invention can be exhibited well.

The alkali treating solution of the invention may also include a surfactant, in addition to the components A, B, and C.

The alkali treatment of the invention may be performed by a dipping treatment wherein the metal core material is dipped and stirred in the alkali treating solution; an ultrasonic cleaning treatment; a treatment wherein the cleaning solution is sprayed; a wiping treatment using a cloth or the like impregnated with the cleaning solution; or a combination of these treatments; with the dipping treatment being preferred.

As stated above, the alkali treatment time (the dipping time) is preferably from 10 to 30 minutes, and more preferably from 10 to 20 minutes.

The alkali treatment temperature is not particularly limited, but is preferably from 30 to 70° C., and more preferably from 40 to 65° C.

When the metal core material undergoes the above-described alkali treatment by the dipping treatment, after the dipping, it is washed with water or hot water and dried.

Next, after the alkali treatment of the metal core material, rubber is anchored to the metal core material without using an adhesive, as described below.

Rubbers that are commonly used for gasket applications can be used as the rubber. It is noted that according to the invention, even when an oil-containing material such as silicon rubber (VMQ) or the like is used, the rubber can be tightly integrated with the metal core material without using an adhesive. Specific examples of silicon rubbers include silicon rubbers (VMQ) manufactured by NOK Corporation; S323, S592, S594, S208, S256, S461, and the like.

Figure 4:
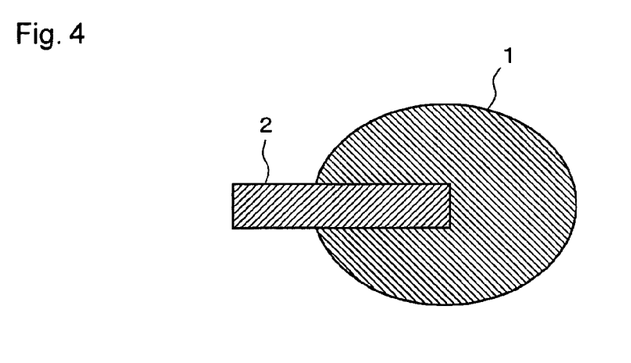
FIG. 4 is a diagram for illustrating the production of gaskets according to the invention.
Figure 5:
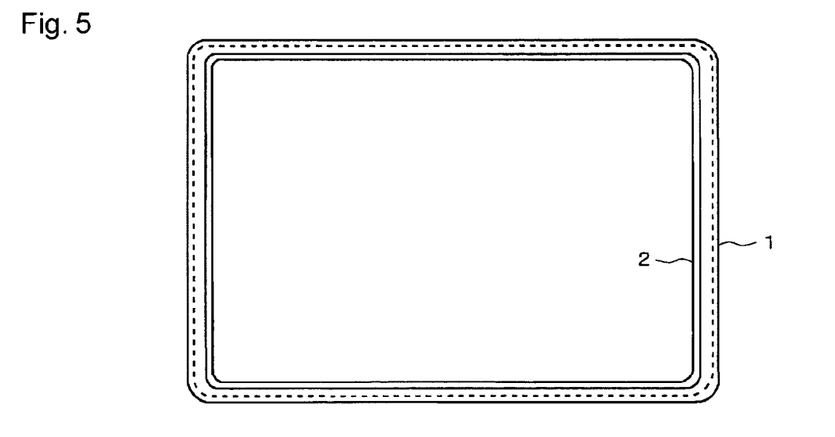
FIG. 5 is a plan view showing an example of a gasket according to the invention.

As shown in FIG. 4, the metal core material 2 is inserted into the rubber 1. As a result, as shown in FIG. 5, a ring-shaped gasket precursor wherein the core material 2 is covered with the rubber 1 so that the rubber 1 sandwiches the core material 2 around the outer periphery thereof is formed.

The core material 2 is inserted into the rubber 1 as follows: the alkali-treated core material 2 is placed in a mold not shown in the figure, after which the mold is filled with unvulcanized rubber 1, thereby embedding the core material 2 into the rubber 1.

The rubber 1 is subsequently vulcanized according to a usual method, which results in the rubber 1 being bonded to and covering the core material 2 so that it sandwiches the core material from the outer periphery thereof. At this time, it is not necessary to use an adhesive to bond the core material 2 and the rubber 1.

The rubber 1 is tightly anchored to the core material 2 because the core material 2 has been both degreased and etched by the alkali treatment; hence, the core material 2 and the rubber 1 become integrated without any peeling.

It is noted that, in the invention, the core material 2 and the rubber 1 can be tightly integrated without the need to provide a through-hole in the core material 2, and provide the rubber 1 with a connecting portion that passes through the through-hole, as in the prior art technique. The invention, however, does not exclude the provision of a through-hole and a connecting portion as in the prior art technique.

EXAMPLES

The effects of the invention are hereinafter described by way of the Examples.

Examples 1 to 8

A ring-shaped core material as shown in FIG. 5 was formed by pressing a 1-mm-thick stainless steel plate (SUS304).

Next, alkaline treating solutions were prepared by adding the treating solutions shown in Table 1 into water at the concentrations shown in Table 1.

The product "PAKUNA SDC" (manufactured by Yuken Industry Co., Ltd.) in Table 1 is an alkaline treating solution containing the components A, B, and C The product "ALUNION E" (manufactured by Yuken Industry Co., Ltd.) in Table 1 an alkaline treating solution containing the component C The product "ALUNION G" (manufactured by Yuken Industry Co., Ltd.) in Table 1 an alkaline treating solution containing the component C The product "CL-391" (manufactured by Nihon Parkerizing Co., Ltd.) in Table 1 an alkaline treating solution containing a surfactant and sodium hydroxide.

The core material underwent the alkali treatment by being dipped in each of the above-mentioned alkaline treating solutions (at 55° C.) for the period of time shown in Table 1, was withdrawn from the alkali treating solution, and washed with water and dried.

The alkali-treated core material was placed in a mold, and the mold was filled with an unvulcanized silicon rubber ("S256" manufactured by NOK Corporation), thereby inserting the core material into the silicon rubber. The silicon rubber was subsequently vulcanized according to a usual method, thus preparing a gasket wherein the core material and rubber were integrated.

Evaluation Methods
<Wettability Test>

After the alkali treatment, the surface of the metal core material was dried for 30 minutes, and then a mixed solution for wetting tension test (520 μN/cm=52 dyn/cm; a solution according to JIS K 6768-1995) was applied to the surface of the metal core material with a swab. The wettability was measured within 2 to 5 seconds after the application (JIS K6768-1995). The wettability can be evaluated as satisfactory when the measured result is 54 dyn/cm or more. The results are shown in Table 1.

<Tackiness Test>

Figure 6:
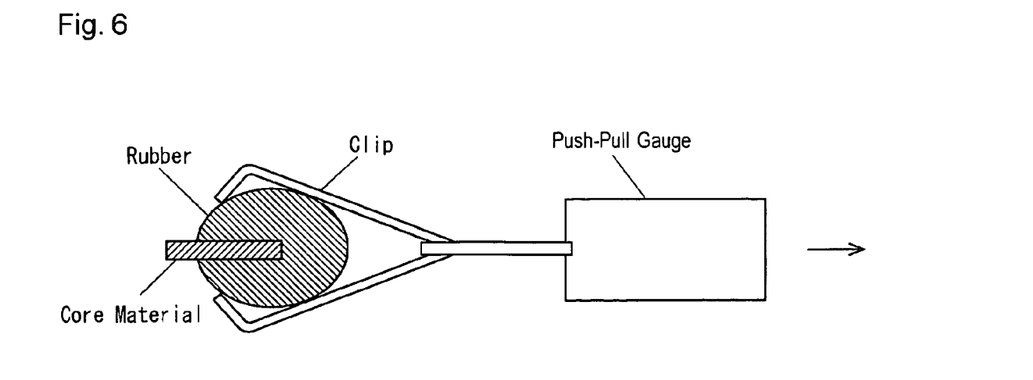
FIG. 6 is a diagram for illustrating the method of the tackiness test.

As shown in FIG. 6, the rubber was pinched with a clip and pulled in the direction of the outside diameter, and the load (N) applied until the rubber was peeled from the core material was measured using a push-pull gauge. The results are shown in Table 1.

Less than 10 N: the tackiness is determined to be insufficient because the rubber was peeled from the core material.

10-13 N: the tackiness is determined to be insufficient because, although the rubber was adhered to the core material, it was peeled when compressed.

13 N or more: the tackiness is determined to be satisfactory because the rubber was tightly anchored to the core material, and was not peeled when compressed.

Comparative Examples 1-6

Evaluation was conducted as in Example 1, except that the alkali treating solutions of the formulations shown in Table 1 were used. The results are shown in Table 1.

It is seen that in the case of plasma treatment (Comparative Example 3) and corona treatment (Comparative Example 4), the wettability was good, but the tackiness was poor.

When "CL-391" containing sodium hydroxide and a surfactant was used (Comparative Example 5), the wettability and tackiness were poor because only the component A of the invention was contained.

Even when the dipping time was increased (Comparative Example 6), the wettability further deteriorated, resulting in insufficient tackiness.

Comparatively, it is seen that both the wettability and tackiness were excellent in Examples 1 to 4.

Example 9

Examination of Alkali Treatment Time

The alkali treatment time was varied in Example 1, and the wettability and tackiness of the gaskets were measured. The results are shown in FIGS. 7 and 8.

Figure 7:
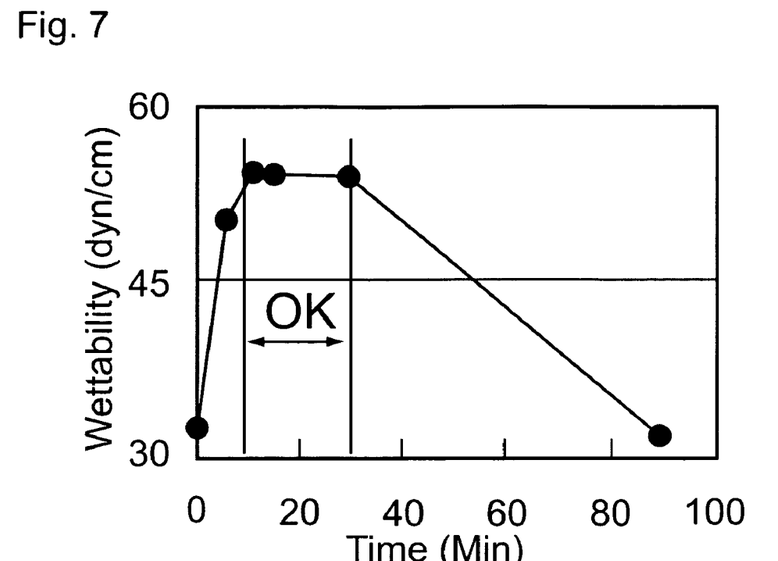
FIG. 7 is a graph showing the relationship between the alkali treatment time and wettability.
Figure 8:
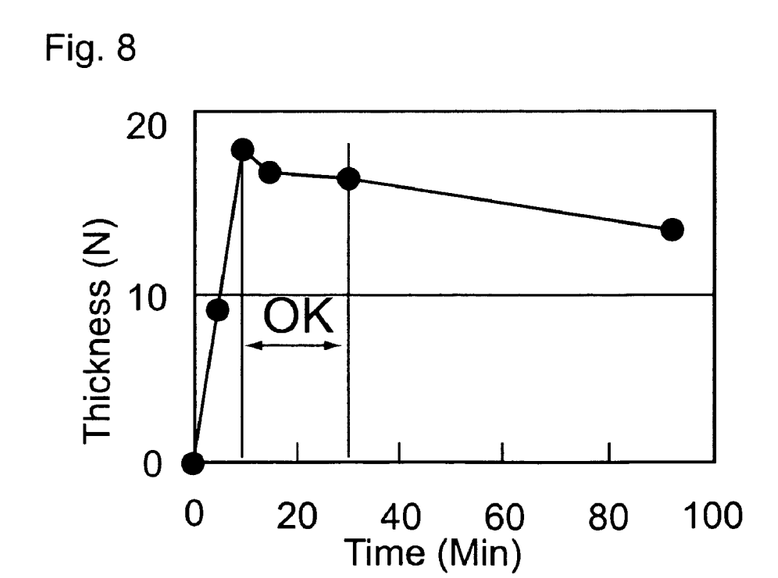
FIG. 8 is a graph showing the relationship between the alkali treatment time and tackiness.

FIG. 7 shows that when the alkali treatment time is from 10 to 30 minutes, the wettability is 54 dyn/cm or more and therefore satisfactory. It is seen that when the treatment time

TABLE 1

| | | | Ex. 1 | Ex. 2 | Ex. 3 | Ex. 4 | Ex. 5 | Ex. 6 | Ex. 7 | Ex. 8 | Comp. Ex. 1 |
|---|---|---|---|---|---|---|---|---|---|---|---|
| Alkali Solution | Component 1 | PAKUNA SDC | 55 g/L | 55 g/L | 55 g/L | 55 g/L | 55 g/L | 55 g/L | 55 g/L | 55 g/L | — (No Treatment) |
| | Component 1 | CL-391 | — | — | — | — | — | — | — | — | — |
| | Component 2 | ALUNION E | 5 g/L | 10 g/L | 20 g/L | — | 30 g/L | 50 g/L | — | — | — |
| | Component 2 | ALUNION G | — | — | — | — | — | — | 5 g/L | 50 g/L | — |
| Acid Solution | Hydrochloric Acid 1 mol | | — | — | — | — | — | — | — | — | 100 g/L |
| | Ferric Chloride | | — | — | — | — | — | — | — | — | 100 g/L |
| Temperature (° C.) | | | 55 | 55 | 55 | 55 | 55 | 55 | 55 | 55 | Room Temperature |
| Immersion Time (min) | | | 15 | 15 | 15 | 15 | 15 | 15 | 15 | 15 | 5 |
| Wettability (dyn/cm) | | | 60 or more | 60 or more | 60 or more | 60 or more | 58 | 60 or more | 60 or more | 60 or more | 38 |
| Tackiness (N) | | | 20.8 | 26.6 | 26.4 | 18.4 | 19.2 | 14.9 | 18.9 | 15.6 | 8.1 |

| | | | Comp. Ex. 2 | Comp. Ex. 3 | Comp. Ex. 4 | Comp. Ex. 5 | Comp. Ex. 6 | Ref. Ex. |
|---|---|---|---|---|---|---|---|---|
| Alkali Solution | Component 1 | PAKUNA SDC | — (No Treatment) | Plasma Treatment | Corona Treatment | — | — | — (No Treatment) |
| | Component 1 | CL-391 | — | — | — | 30 g/L | 30 g/L | — |
| | Component 2 | ALUNION E | — | — | — | — | — | — |
| | Component 2 | ALUNION G | — | — | — | — | — | — |
| Acid Solution | Hydrochloric Acid 1 mol | | 100 g/L | — | — | — | — | — |
| | Ferric Chloride | | 100 g/L | — | — | — | — | — |
| Temperature (° C.) | | | Room Temperature | — | — | 60 | 60 | — |
| Immersion Time (min) | | | 10 | — | — | 5 | 15 | — |
| Wettability (dyn/cm) | | | 54 | 60 or more | 58 | 42 | 38 or less | 38 or less |
| Tackiness (N) | | | 10.7 | 0 | 2.1 | 9.8 | 16.2 | 0 |

When an acid solution only was used (Comparative Example 1), the wettability and tackiness were poor; even when the dipping time using the acid solution was increased (Comparative Example 2), the wettability was acceptable, but the tackiness was insufficient.

is less than 10 minutes or exceeds 30 minutes, the wettability is less than 54 dyn/cm and therefore insufficient.

Also, it is seen from FIG. 8 that when the alkali treatment time is from 10 to 30 minutes, the tackiness is 13 N or more, so that the rubber is tightly anchored to the core material and hence is not peeled when compressed.

In FIGS. 7 and 8, the region of the alkali treatment time in which the wettability and tackiness are satisfactory is denoted by "OK".

The invention claimed is:

1. A process for producing gaskets comprising the steps of:
    forming a metal core material using a stainless steel plate;
    treating the resulting metal core material with an alkali treating solution;
    preparing an unvulcanized rubber molded product;
    mounting the metal core material treated in the treating step to the unvulcanized rubber molded product; and
    vulcanizing the rubber-molded product to thereby anchor the elastic material to the metal core material without using an adhesive;
    characterized in that the alkali treating solution used in the step of alkali treatment comprises:
    (A) an alkali metal hydroxide or an alkaline earth metal hydroxide;
    (B) an alkali metal silicate or an alkaline earth metal silicate; and
    (C) a carboxylate salt;
    the step of alkali treatment comprising the step of causing a plurality of OH groups to form single-bonds so as to cover an entire surface of the stainless steel plate to be treated, using the components (A) and (B) contained in the alkali treating solution; and
    the alkali treatment being performed for 10 to 30 minutes.

2. The process for producing gaskets according to claim 1, wherein the alkali treating solution used in the step of alkali treatment comprises a surfactant in addition to the components (A), (B), and (C).

3. The process for producing gaskets according to claim 1 or 2, wherein the alkali treatment time is from 10 to 20 minutes.

* * * * *